US008347691B2

(12) United States Patent
Makino et al.

(10) Patent No.: US 8,347,691 B2
(45) Date of Patent: Jan. 8, 2013

(54) APPARATUS AND METHOD FOR CHECKING LEAKAGE FROM FUEL VAPOR PROCESSING APPARATUS

(75) Inventors: Katsuhiko Makino, Aichi-ken (JP); Junya Kimoto, Obu (JP); Takashi Mani, Hekinan (JP); Masaki Ikeya, Obu (JP)

(73) Assignee: Aisan Kogyo Kabushiki Kaisha, Aichi-ken (JP)

( * ) Notice: Subject to any disclaimer, the term of this patent is extended or adjusted under 35 U.S.C. 154(b) by 297 days.

(21) Appl. No.: 12/781,016

(22) Filed: May 17, 2010

(65) Prior Publication Data

US 2010/0288021 A1 Nov. 18, 2010

(30) Foreign Application Priority Data

May 18, 2009 (JP) ................................ 2009-119845

(51) Int. Cl.
*G01M 3/26* (2006.01)

(52) U.S. Cl. ........................................................ 73/49.7

(58) Field of Classification Search .................... 73/49.7
See application file for complete search history.

(56) References Cited

U.S. PATENT DOCUMENTS

| | | | | | |
|---|---|---|---|---|---|
| 5,542,397 | A * | 8/1996 | Takahata et al. | .............. | 123/520 |
| 5,635,630 | A * | 6/1997 | Dawson et al. | ............ | 73/40.5 R |
| 5,750,888 | A * | 5/1998 | Matsumoto et al. | ....... | 73/114.39 |
| 6,220,229 | B1 * | 4/2001 | Kawamura et al. | ........... | 123/520 |
| 6,223,732 | B1 * | 5/2001 | Isobe et al. | .................... | 123/520 |
| 6,276,343 | B1 * | 8/2001 | Kawamura et al. | ........... | 123/520 |
| 6,487,892 | B1 * | 12/2002 | Ito et al. | .......................... | 73/49.2 |
| 6,761,058 | B2 * | 7/2004 | Yamaguchi et al. | ....... | 73/40.5 R |
| 6,865,928 | B2 * | 3/2005 | Yanase et al. | .............. | 73/114.39 |
| 7,290,535 | B2 * | 11/2007 | Kimura | ......................... | 123/520 |
| 2006/0090553 | A1 * | 5/2006 | Nagasaki et al. | ............ | 73/118.1 |

FOREIGN PATENT DOCUMENTS

| | | |
|---|---|---|
| JP | 2001-304053 | 10/2001 |
| JP | 2004-092510 | 3/2004 |
| JP | 2004 270573 | 9/2004 |

* cited by examiner

*Primary Examiner* — John Fitzgerald
(74) *Attorney, Agent, or Firm* — Dennison, Schultz & MacDonald

(57) ABSTRACT

An apparatus for checking leakage from a fuel vapor processing apparatus includes an interrupting device capable of interrupting communication between a canister and a fuel tank when a pressure within the canister is negative and a pressure within the fuel tank is positive. A first pressure detecting device can detect the pressure within the canister or its equivalent. A second pressure detecting device can detect the pressure within the fuel tank or its equivalent.

10 Claims, 6 Drawing Sheets

APPARATUS AND METHOD FOR CHECKING LEAKAGE FROM FUEL VAPOR PROCESSING APPARATUS

This application claims priority to Japanese patent application serial number 2009-119845, the contents of which are incorporated herein by reference.

BACKGROUND OF THE INVENTION

1. Field of the Invention

The present invention relates to an apparatus and a method for checking leakage of fluid, such as air, fuel vapor, liquid fuel, etc., from a fuel vapor processing apparatus that includes a canister communicating with a fuel tank of an automobile via a communication passage.

2. Description of the Related Art

A known method for checking leakage of fluid from a fuel vapor processing apparatus is disclosed, for example, in Japanese Laid-Open Patent Publication No. 2004-270573. As shown in FIG. 6, a fuel vapor processing apparatus 100 disclosed in this publication includes a vapor passage 104 for introducing fuel vapor produced within a fuel tank T into a canister 102, an atmospheric-side opening and closing device 105 having a throttle and provided at the canister 102, and a recovery passage 103 communicating between the canister 102 and an intake air passage 107 of an engine. A jet pump 106 is disposed within the fuel tank T for generating a negative pressure. The jet pump 106 communicates with the intake air passage 107 of the engine via an intake air pipe 108.

In order to check leakage from the fuel vapor processing apparatus 100, a valve 103*v* provided in the recovery passage 103 is closed and the jet pump 106 is operated on the condition that the atmospheric-side opening and closing device 105 is operated to open through the throttle. Then, an external air is introduced into the fuel tank T via the intake air passage 107 and the intake air pipe 108 of the engine, so that the pressure within the fuel tank T as well as the pressure within the canister 102 communicating with the fuel tank T via the vapor passage 104 increases. The pressure increase curve measured at that time is compared with a reference pressure increase curve for checking leakage.

According to the method for checking leakage disclosed in the above publication, the internal space of the fuel tank T and the internal space of the canister 102 are pressurized for checking leakage. Therefore, it is necessary to introduce a large amount of external air into the fuel tank T and the canister 102. This also requires that a large amount of air is discharged to the outside after checking leakage. When a large amount of air is discharged to the outside, it may be possible that fuel vapor adsorbed and retained within the canister 102 is discharged to the outside together with the air.

Therefore, there is a need in the art for an apparatus and a method for checking leakage of fluid from a fuel vapor processing apparatus, which doe not require introduction of a large amount of air for checking.

SUMMARY OF THE INVENTION

An apparatus for checking leakage of fluid from a fuel vapor processing apparatus includes an interrupting device capable of interrupting communication between a canister and a fuel tank when a pressure within the canister is negative and a pressure within the fuel tank is positive. A first pressure detecting device can detect the pressure within the canister or its equivalent. A second pressure detecting device can detect the pressure within the fuel tank or its equivalent.

DETAILED DESCRIPTION OF THE INVENTION

Figure 1A:
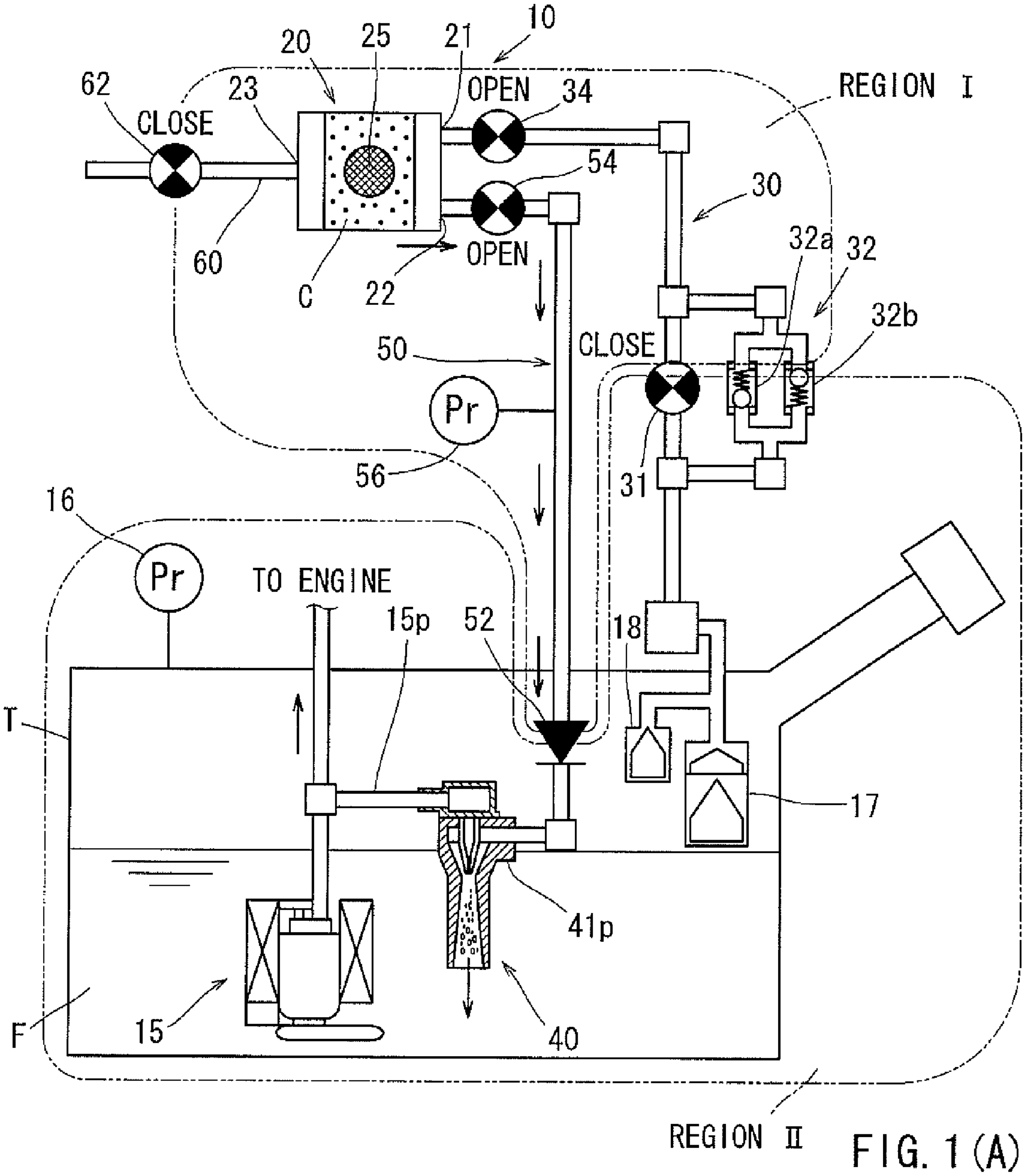
FIG. 1(A) is a schematic view of a fuel vapor processing apparatus incorporating an apparatus for checking leakage of fluid according to an example.

Each of the additional features and teachings disclosed above and below may be utilized separately or in conjunction with other features and teachings to provide improved apparatus and methods for checking leakage of fluid from fuel vapor processing apparatus. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

In a representative example, an apparatus for checking leakage of fluid from a fuel vapor processing apparatus includes a passage interrupting device capable of interrupting communication of a communication passage that communicates between a fuel tank and a canister. A first pressure detecting device can detect a first pressure that is a pressure within the canister or a pressure equivalent to the pressure within the canister. A second pressure detecting device can detect a second pressure that is a pressure within the fuel tank or a pressure equivalent the pressure within the fuel tank. In the state that the first pressure is negative and the second pressure within the fuel tank is positive, the passage interrupting device can interrupt communication between a side of the canister and a side of the fuel tank of the communication passage for checking leakage from the fuel vapor processing apparatus.

Because it is possible to check leakage of fluid in the state that the pressure within the canister is negative and the pressure within the fuel tank is positive, the amount of air that is necessary to be introduced into the fuel vapor processing apparatus can be reduced in comparison with the case where leakage is checked in the state that both of the pressure within the canister and the pressure within the fuel tank are positive. Therefore, the amount of air discharged to the atmosphere after checking leakage can be reduced, and hence, it is possible to prevent fuel vapor from being leaked to the atmosphere.

The checking apparatus may further include a negative pressure generating device disposed within the fuel tank and capable of drawing air within the canister into the fuel tank, so that the pressure within the canister becomes negative and the pressure within the fuel tank becomes positive.

Because the negative pressure within the canister and the positive pressure within the fuel tank can be achieved by urging air within the canister to flow toward the fuel tank, it is not necessary to introduce external air into the fuel vapor processing apparatus for checking leakage.

The negative pressure generating device may generate a negative pressure by utilizing a flow of fuel discharged from a fuel pump disposed within the fuel tank.

The passage interrupting device may be a unidirectional check valve permitting flow of fluid from the canister toward the fuel tank and preventing flow of fluid from the fuel tank toward the canister. Therefore, it is possible to automatically interrupt communication between the canister side and the fuel tank side of the communication passage in the state that the pressure within the canister is negative and the pressure within the fuel tank is positive.

In a representative example, a method for checking leakage of fluid from a fuel vapor processing apparatus includes setting a pressure within the canister to be negative, setting a pressure within the fuel tank to be positive, interrupting communication between a side of the canister and a side of the fuel tank of the communication passage in a state that the pressure within the canister is negative and the pressure within the fuel tank is positive, and monitoring the pressure within the canister or its equivalent and the pressure within the fuel tank or its equivalent.

The steps of setting the pressures within the canister and the fuel tank may include providing a negative pressure generating device within the fuel tank, and operating the negative pressure generating device for drawing air within the canister into the fuel tank via the communication passage, so that the pressure within the canister becomes negative and the pressure within the fuel tank becomes positive.

EXAMPLE

An example will now be described with reference to FIGS. 1 and 2. A fuel vapor processing apparatus shown in FIG. 1 can prevent or inhibit fuel vapor, which may be produced within a fuel tank T of an automobile, from being leaked into the atmosphere. This fuel vapor processing apparatus is also configured to be able to recover the fuel vapor in to the fuel tank T. An apparatus for checking leakage of fluid of this example is associated with the fuel vapor processing apparatus and can check leakage of fluid from the fuel vapor processing apparatus.

(General Construction of Fuel Vapor Processing Apparatus)

Referring to FIG. 1, a fuel vapor processing apparatus 10 generally includes a canister 20 capable of adsorbing and desorbing fuel vapor, a vapor passage 30 for introducing fuel vapor produced within the fuel tank T into the canister 20, an aspirator 40 disposed within the fuel tank T for generating a negative pressure, a recovery passage 50 communicating between the aspirator 40 and the canister 20, and an atmospheric passage 60 capable of opening the canister 20 into the atmosphere.

The fuel tank T is configured as a substantially hermetically sealed tank and serves to store fuel F to be supplied to an engine of an automobile. A fuel pump 15 is disposed within the fuel tank T for feeding the fuel F into the engine under pressure. More specifically, the fuel pump 15 is configured such that a part of the fuel F discharged from the fuel pump 15 can be supplied to the aspirator 40. As will be explained later, the aspirator 40 can generate a negative pressure by using the flow of the fuel F supplied from the fuel pump 15.

A first pressure sensor 16 is mounted to the fuel tank T for detecting the internal pressure of the fuel tank T and outputting a pressure detection signal to an ECU (engine control unit) (not shown).

(Canister)

The canister 20 is configured as a substantially hermetically sealed container. An adsorption material C made of activator carbon or any other suitable material is filled into the canister 20. The canister 20 includes a vapor port 21 connected to the vapor passage 30, a recovery port 22 connected to the recovery passage 50, and an atmospheric port 23 connected to the atmospheric passage 60. Therefore, the adsorption material C can adsorb fuel vapor, when the fuel vapor is introduced from the vapor passage 30 into the canister 20 via the vapor port 21. When the aspirator 40 is operated to apply a negative pressure to the canister 30 via the recovery passage 50 and the recovery port 22, fuel vapor adsorbed by the adsorption material C may be desorbed from the adsorption material C. Further, a heater 25 is disposed within the canister 20 and can heat the adsorption material C during desorption of the fuel vapor from the adsorption material C. Typically, the adsorption material C that is made of activated carbon or the like has such a characteristic that the fuel vapor can be more easily desorbed from the adsorption material C as the temperature increases.

An atmospheric-side solenoid valve 62 is provided at the atmospheric passage 60 of the canister 20. The atmospheric-side solenoid valve 62 can close when energized (ON turning), and it can open when non-energized (OFF turning). The atmospheric-side solenoid valve 62 operates according to an operation signal supplied from the ECU. More specifically, the atmospheric-side solenoid valve 62 is opened during filling of fuel into the fuel tank T and when the internal pressure of the fuel tank T becomes equal to or more than a maximum limit value.

(Vapor Passage)

As described previously, the vapor passage 30 serves to introduce the fuel vapor produced within the fuel tank T into the canister 20. A fill-up restriction valve 17 and a cut-off valve 18 are connected to the fuel tank-side end portion of the vapor passage 30. The fill-up restriction valve 17 opens when the level of the fuel F within the fuel tank T is equal to or lower than a fill-up level, while it closes when the fuel level exceeds the fill-up level. To this end, the fill-up restriction valve 17 has a float valve member floating on the fuel surface and moving upward to close its flow passage when the fuel level exceeds the fill-up level. The cut-off valve 18 is positioned at a higher level than the fill-up restriction valve 17 and normally opens.

For example, when the automobile has been overturned by a traffic accident or the like, the cut-off valve 18 can operate to close.

A first solenoid valve 31 and a bi-directional check valve 32 are provided in the midway of the vapor passage 30 and are arranged in parallel to each other. The first solenoid valve 31 can open when it is energized (ON turning), while it can close when it is not energized (OFF turning). The first solenoid valve 31 operates according to a control signal supplied from the ECU. More specifically, the first solenoid valve 31 is normally closed and can open during filling of the fuel into the fuel tank T.

The bi-directional check valve 32 includes a positive pressure valve 32*a* and a negative pressure valve 32*b*. The positive pressure valve 32*a* opens when the internal pressure of the fuel tank T is equal to or more than a predetermined value (e.g., about +5 kPa). The negative pressure valve 32*b* opens when the internal pressure of the fuel tank T is equal to or less than a predetermined value (e.g., about −5 kPa). Therefore, for example, if the relationship "+5 kPa>P>−5 kPa" is resulted, both of the positive and negative pressure valves 32*a* and 32*b* are closed. Here, "P" designates the internal pressure of the fuel tank.

A second solenoid valve 34 is provided at the canister-side end portion of the vapor passage 30. The second solenoid valve 34 can close when it is energized, while it can open when it is not energized. The first solenoid valve 34 operates according to a control signal supplied from the ECU. More specifically, the second solenoid valve 34 opens when the internal pressure P of the fuel tank T becomes equal to or more than a predetermined value (e.g., +5 kPa) or during collection of the fuel vapor.

(Aspirator)

The aspirator 40 is constructed to generate a negative pressure by utilizing the flow of the fuel F supplied from the fuel pump 15. As shown in FIG. 1(B), the aspirator 40 is constituted by a venturi part 41 and a nozzle part 45. The venturi part 41 defines therein a throttle portion 42, an inlet-side diameter decreasing portion 43 positioned on the upstream side of the throttle portion 42, and an outlet-side diameter increasing portion 44 positioned on the downstream side of the throttle portion 42. In this example, the inlet-side diameter decreasing portion 43, the throttle portion 42 and the outlet-side diameter increasing portion 44 are formed coaxially with each other. A suction port 41*p* for connection with the recovery passage 50 is formed with the upstream-side end of the inlet-side diameter decreasing portion 43 of the venturi part 41.

The nozzle part 45 includes a nozzle body 46 coaxially received within the inlet-side diameter decreasing portion 43 of the venturi part 41. The nozzle body 46 has a jet orifice 46*p* positioned proximal to the throttle portion 42 of the venturi part 41. In addition, a fuel supply port 47 for connection with a branch pipe 15*p* of the fuel pump 15 (see FIG. 1(A)) is formed at the base end (on the side opposite to the jet orifice 46*p*) of the nozzle body 46.

With the above construction, the fuel F supplied from the fuel pump 15 to the aspirator 40 is injected from the jet orifice 46*p* of the nozzle body 46 and flows at a high speed through the throttle portion 42 and the central portion of the outlet-side diameter increasing portion 44 in the axial direction of the venturi part 41. Therefore, the pressure of the region around the throttle portion 42 of the venturi part 41 becomes negative, so that fluid (i.e. the fuel vapor and air) contained within the inlet-side diameter decreasing portion 43 flows toward the downstream side along with the fuel F injected from the nozzle body 46. Hence, fluid (i.e., fuel vapor and other) contained within the recovery passage 50 connected to the suction port 41*p* of the venturi part 41 may be drawn into the venturi part 41. In this way, the aspirator 40 serves as a negative pressure generating device.

(Recovery Passage)

The recovery passage 50 connects between the recovery port 22 of the canister 20 and the suction port 41*p* of the aspirator 40. A unidirectional check valve 52 is provided at the fuel tank-side end portion of the recovery passage 50. The unidirectional check valve 52 permits flow of fluid from the canister 20 toward the aspirator 40 but prevents flow of fluid from the aspirator 40 toward the canister 20.

A solenoid valve 54 for recovering the fuel vapor (herein after called "recovery solenoid valve 54") is provided at the canister side end portion of the recovery passage 50. The recovery solenoid valve 54 can open when it is energized, while it can close when it is not energized. The recovery solenoid valve 54 operates according to a control signal supplied from the ECU. More specifically, the recovery solenoid valve 54 opens during recovering of the fuel vapor.

A second pressure sensor 56 is mounted to the recovery passage 50 at a position between the recovery solenoid valve 54 and the unidirectional check valve 52. The second pressure sensor 56 outputs its detection signal to the ECU.

(Operation of Fuel Vapor Processing Apparatus)

During filling of the fuel into the fuel tank T, the first solenoid valve 31 and the second solenoid valve 34 of the vapor passage 30 and the atmospheric side solenoid valve 62 of the atmospheric passage 60 are opened. On the other hand, the recovery solenoid valve 54 of the recovery passage 50 is closed. Therefore, during filling of the fuel, gas (air and fuel vapor) within the fuel tank T is urged to flow into the vapor passage 30 via the fill-up restriction valve 17 and the cut-off valve 18 and further into the canister 20 by flowing through the first and second solenoid valves 31 and 34 of the vapor passage 30 (see arrows in FIG. 3). Then, the fuel vapor is adsorbed by the adsorption material C of the canister 20, while air remaining due to removal of the fuel vapor is discharged from the canister 20 to the atmosphere via the atmospheric-side solenoid valve 62 of the atmospheric passage 60.

During collection of the fuel vapor, the first solenoid valve 31 of the vapor passage 30 is closed, while the second solenoid valve 34 of the vapor passage 30 and the atmospheric side solenoid valve 62 of the atmospheric passage 60 are opened. On the other hand, the recovery solenoid valve 54 of the recovery passage 50 is closed. Therefore, air and fuel vapor within the fuel tank T can flow into the canister 20 through the vapor passage 30 when the internal pressure of the fuel tank T is equal to or more than the predetermined pressure (e.g., +5 kPa) set for the positive pressure valve 32*a* of the bi-directional check valve 32. The fuel vapor flown into the canister 20 is adsorbed by the adsorption material C, and air remaining after removal of the fuel vapor is discharged from the canister 20 to the atmosphere via the atmospheric-side solenoid valve 62 of the atmospheric passage 60.

During recovering of the fuel vapor, the first solenoid valve 31 and the second solenoid valve 34 of the vapor passage 30 and the atmospheric side solenoid valve 62 of the atmospheric passage 60 are closed. On the other hand, the recovering solenoid valve 54 of the recovery passage 54 is opened. Further, the fuel pump 15 is driven, so that the aspirator 40 is operated to cause fuel vapor and air, etc., stored within the canister 20 to be drawn into the aspirator 40 via the recovery passage 50, the recovery solenoid valve 54 and the unidirectional check valve 52. Fuel vapor, etc. drawn into the aspirator 40 is thereafter discharged from the aspirator 40 into the fuel F within the fuel tank T so as to be recovered.

(Method for Checking Leakage)

Methods for checking leakage from the fuel vapor processing apparatus 10 will now be described. First, a method for checking leakage by introducing external air will be described.

Figure 2A:
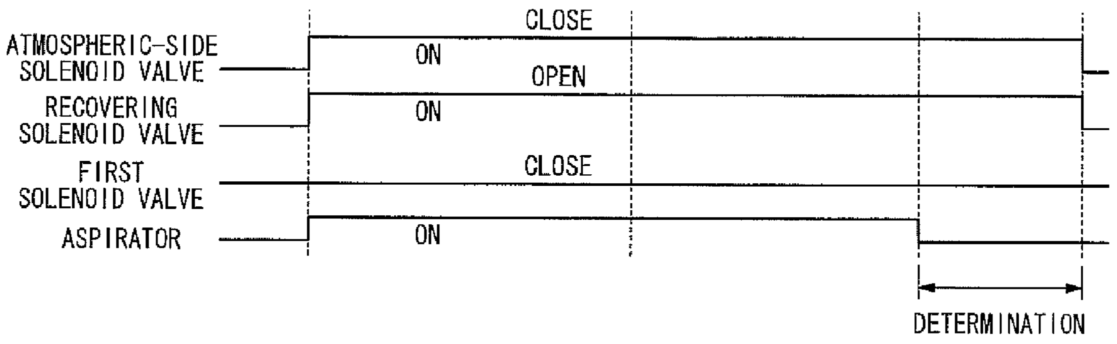
FIGS. 2(A) and 2(B) are time charts showing operations of various valves for checking leakage from the fuel vapor processing apparatus in different check modes.
Figure 2B:
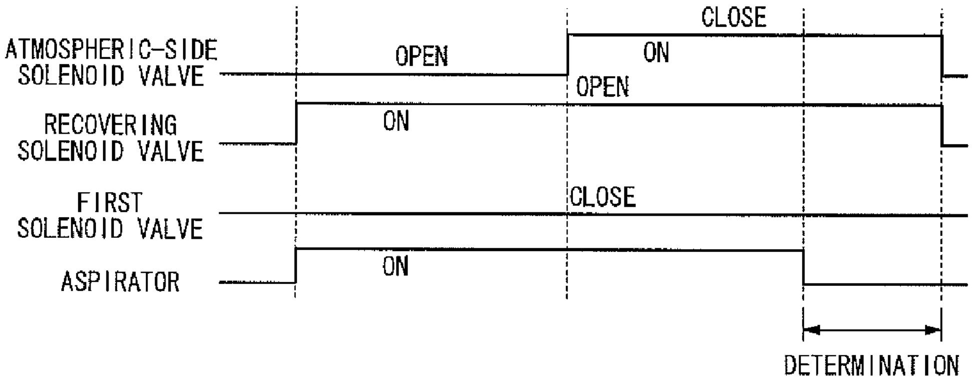

In this method, the fuel pump 15 is driven to operate the aspirator 40 on the condition that the atmospheric-side solenoid valve 62 of the atmospheric passage 60 is opened (turned OFF), the recovery solenoid valve 54 of the recovery passage 50 is opened (turned ON), and the first solenoid valve 31 of the vapor passage 30 is closed (turned OFF) as indicated in the time charge shown in FIG. 2(B). In this state, because the relationship "+5 kPa>P>−5 kPa" results for the internal pressure P of the fuel tank T, the bi-directional check valve 32 of the vapor passage 30 is closed.

Figure 2C:
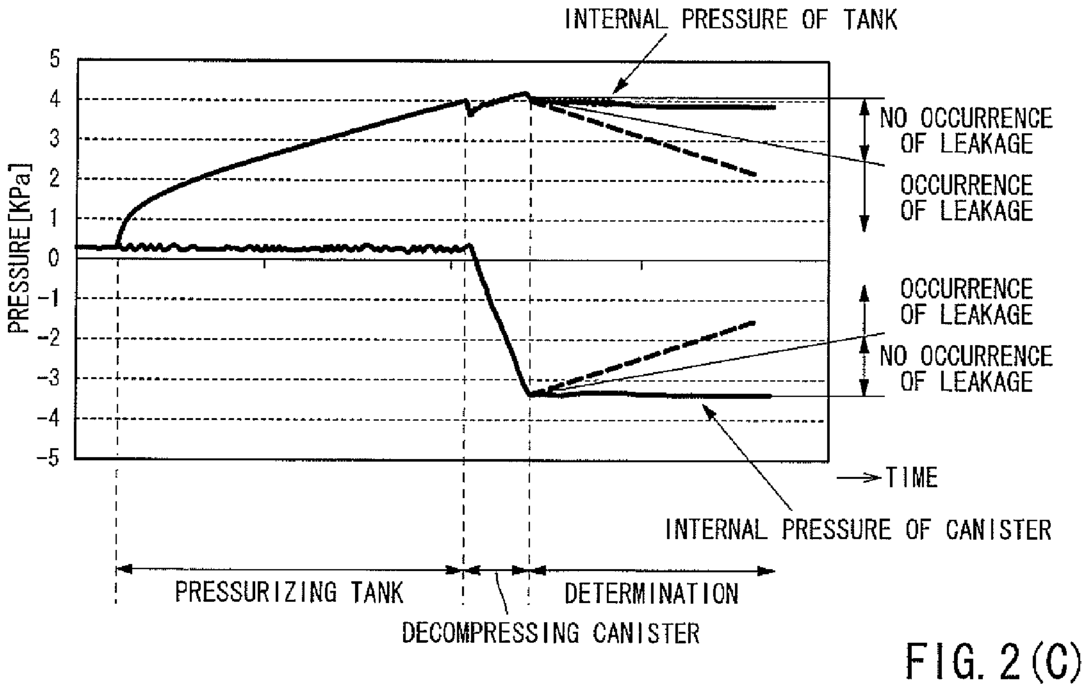
FIG. 2(C) is a graph showing changes of pressures within a fuel tank and a canister of the fuel vapor processing apparatus.

As the aspirator 40 operates, external air is supplied into the fuel tank T via the atmospheric passage 60, the canister 20, the recovery passage 50 (and the unidirectional check valve 52 of the recovery passage 50). Therefore, the internal pressure of the fuel tank T gradually increases as shown in FIG. 2(C). As described previously, the internal pressure of the fuel tank T is detected by the first pressure sensor 16. When the internal pressure reaches a predetermined value, e.g., +4 kPa, the atmospheric-side solenoid valve 62 of the atmospheric passage 60 is closed (turned ON).

Therefore, air contained within the canister 20 is drawn into the fuel tank T, so that the internal pressure of the fuel tank T further increase as the internal pressure within the canister 20 becomes negative. When the internal pressure of the canister 20 reaches a predetermined value, e.g., −3.2 kPa, the fuel pump 15 and eventually the aspirator 40 are stopped. As described previously, the second pressure sensor 56 detects the pressure within the canister 20. Even after the operation of the aspirator 40 has stopped, the pressure on the side of the canister 20 may be held negative and the pressure on the side of the fuel tank T may be held positive by the action of the unidirectional check valve 52 of the recovery passage 50.

Figure 1B:
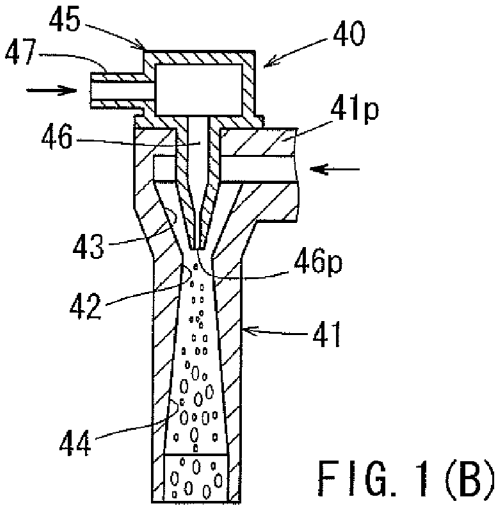
FIG. 1(B) is a vertical sectional view of an aspirator of the fuel vapor processing apparatus.

The internal pressure of the canister 20 (i.e., a system pressure within Region I indicated in FIG. 1(A)) and the internal pressure of the fuel tank T (i.e., a system pressure within Region II in FIG. 1(A)) are monitored during a predetermined period. If a pressure increasing ratio of the internal pressure of the canister 20 is smaller than a reference pressure increasing ratio and a pressure decreasing ratio of the internal pressure of the fuel tank T is smaller than a reference pressure decreasing ratio, determination is made that there is no occurrence of leakage (i.e., no hole in the system causing leakage).

In this way, the recovering passage 50 serves as a communication passage communicating between the fuel tank T and the canister 20. The unidirectional check valve 52 serves as a passage interrupting device for interrupting communication of the communication passage. The first pressure sensor 16 serves as a pressure detecting devices for detecting the pressure within the fuel tank T. The second pressure sensor 56 serves as a pressure detecting device for detecting the pressure within the canister 20.

Next, a method for checking leakage without introducing external air will be described.

In this method, the fuel pump 15 is driven to operate the aspirator 40 on the condition that the atmospheric-side solenoid valve 62 of the atmospheric passage 60 is closed (turned ON), the recovery solenoid valve 54 of the recovery passage 50 is opened (turned ON), and the first solenoid valve 31 of the vapor passage 30 is closed (turned OFF) as indicated in the time charge shown in FIG. 2(A).

Therefore, air contained within the canister 20 is drawn into the fuel tank T, so that the internal pressure within the canister 20 becomes negative and the internal pressure of the fuel tank T increase. When the internal pressure of the canister 20 reaches a predetermined negative value and the internal pressure of the fuel tank T reaches a predetermined positive value, the fuel pump 15 and eventually the aspirator 40 are stopped.

Next, the internal pressure of the canister 20 (i.e., a system pressure within Region I indicated in FIG. 1(A)) and the internal pressure of the fuel tank T (i.e., a system pressure within Region II in FIG. 1(A)) are monitored during a predetermined period in the same manner as the above-described method, so that it is determined whether or not leakage occurs.

According to the above methods, it is possible to check leakage from the fuel vapor processing apparatus 10 in the state that the pressure on the canister side (Region I in FIG. 1(A)) is kept negative, while the pressure on the fuel tank side (Region II in FIG. 1(A)) is kept positive. Therefore, in comparison with a method of checking leakage in the state that both of pressures on the canister side and the fuel tank side are kept positive, it is possible to reduce the amount of external air flowing into the fuel vapor processing apparatus. Hence, it is possible to reduce the amount of air that may be discharged from the fuel vapor processing apparatus after checking leakage. As a result, it is possible to prevent or inhibit fuel vapor from being discharged from the canister 20 to the atmosphere.

In particular, in the case that no external air enters the fuel vapor processing apparatus, no air is discharged after checking leakage. Therefore, it is possible to completely prevent fuel vapor from being discharged to the atmosphere.

Further, by the incorporation of the unidirectional check valve 52, it is possible to automatically interrupt communication between the side of the canister 20 and the side of the fuel tank T when the pressure within the canister 20 has become negative and the pressure within the fuel tank has become positive.

Another Example

Figure 3:
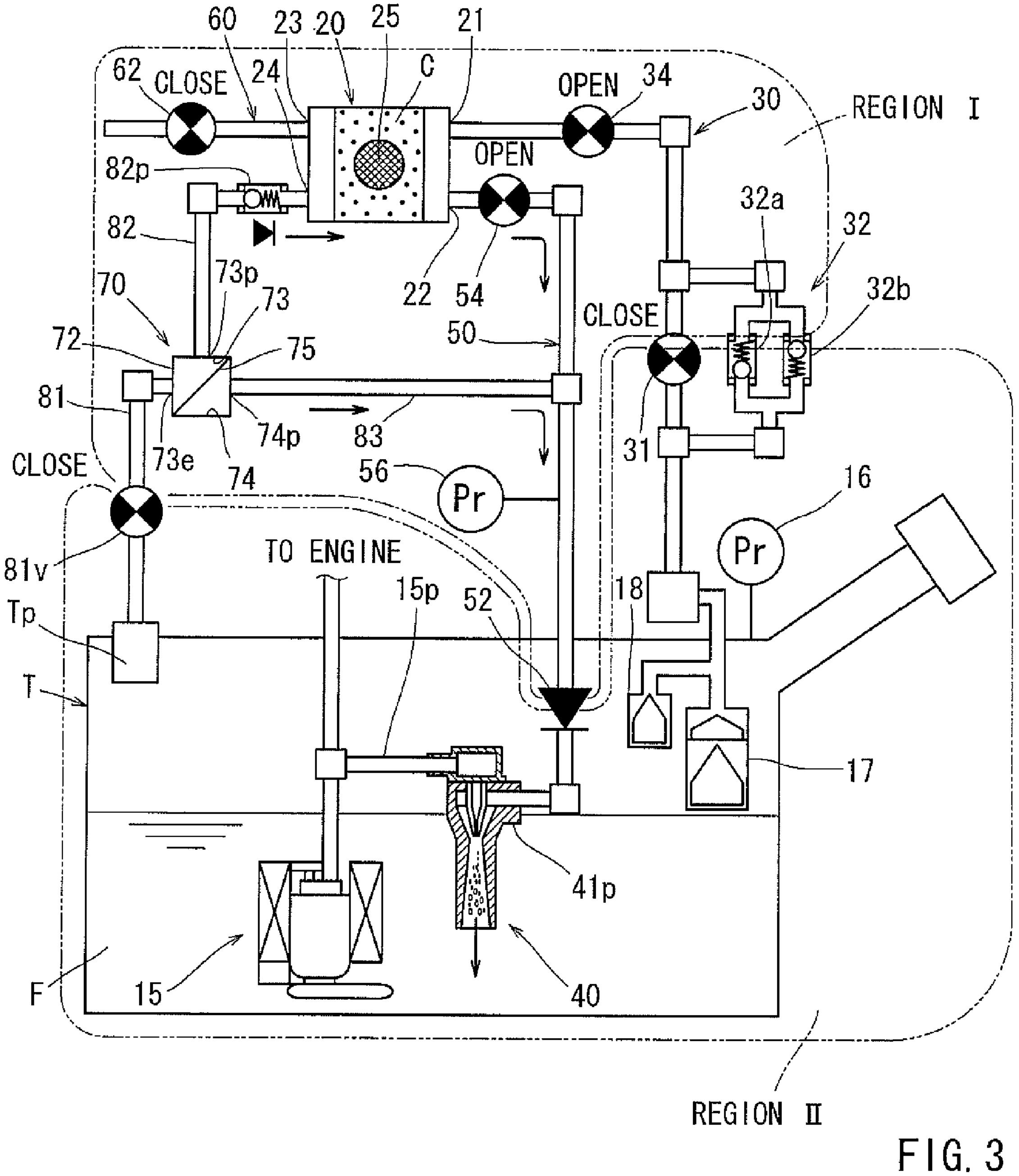
FIG. 3 is a schematic view of a fuel vapor processing apparatus incorporating an apparatus for checking leakage of fluid according to another example.

Another method for checking leakage from a fuel vapor processing apparatus will now be described with reference to FIGS. 3 and 4. A fuel vapor processing apparatus shown in FIG. 3 is different from the fuel vapor processing apparatus 10 in that a separation container 70 and first, second and third passages 81, 82 and 83 are additionally incorporated. Therefore, in FIG. 3, like members are given the same reference numerals as the above example.

(Separation Container)

Referring to FIG. 3, the separation container 70 serves to separate gas, which is introduced from within the fuel tank T, into a fuel component and an air component. The separation container 70 includes a container body 72 and a separation membrane 75 that divides the internal space of the container body 72 into a primary chamber 73 and a secondary chamber 74. The container body 72 has an inlet port 73*e* and a primary output port 73*p* communicating with the primary chamber 73 and connected to the first passage 81 and the second passage 82, respectively. The container body 72 also has a secondary outlet port 74*p* communicating with the secondary chamber 74 and connected to the third passage 83.

The separation membrane 75 preferentially allows passage of a fuel component contained in gas but inhibits passage of an air component of the gas. More specifically, the separation membrane 75 is constituted by a non-porous thin membrane layer and a porous support membrane layer that supports the thin membrane layer. The non-porous thin membrane performs a primary function of the separation membrane 75. Therefore, when gas within the fuel tank T is introduced into the primary chamber 73 of the separation container 70, a fuel component of the gas may pass through the separation membrane 75 to move into the secondary chamber 74, so that an air component of the gas remains within the primary chamber 73.

(First to Third Passages)

The first passage 81 is configured to introduce gas within the fuel tank T into the primary chamber 73 of the separation container 70. One end of the first passage 81 is connected to a top port Tp of the fuel tank T, and the other end of the first passage 81 is connected to the inlet port 73*e* of the separation container 70. A tank-side solenoid valve 81*v* is mounted to the first passage 81. The tank-side solenoid valve 81*v* opens when energized (ON turning), while it closes when non-energized (OFF turning). The tank-side solenoid valve 81*v* operates according to an operation signal supplied from the ECU. More specifically, the tank-side solenoid valve 81*v* is opened during recovering of the fuel vapor.

The second passage 82 is configured to introduce the air component collected within the primary chamber 73 of the separation container 70 into the canister 20. One end of the second passage 82 is connected to the primary outlet port 73*p* of the separation container 70, and the other end of the second passage 82 is connected to the purge port 24 of the canister 20. A pressure control valve 82*p* is provided in the second passage 82 and serves to maintain a negative pressure within the canister 20 and also within the secondary chamber 74 of the separation container 70 during recovering of the fuel vapor.

The third passage 83 is configured to introduce the fuel component collected within the secondary chamber 74 of the separation container 70 into the recovery passage 50. One end of the third passage 83 is connected to the secondary outlet port 74*p* of the separation container 70, and the other end of the third passage 83 is connected to the recovery passage 50 at a position on the upstream side of the second pressure sensor 56.

(Operation of Fuel Vapor Processing Apparatus)

The operations of the fuel vapor processing apparatus of this example during filling of the fuel into the fuel tank T and during collection of the fuel vapor are the same as the above example, and therefore, only the operation during recovering of the fuel vapor will be described.

During recovering of the fuel vapor, the first solenoid valve 31 and the second solenoid valve 34 of the vapor passage 30 and the atmospheric side solenoid valve 62 of the atmospheric passage 60 are closed. On the other hand, the recovering solenoid valve 54 of the recovery passage 50 and the tank-side solenoid valve 81*v* of the first passage 81 of the separation container 70 are opened.

Further, as the fuel pump 15 is driven, the aspirator 40 is operated, so that fuel vapor and air, etc., stored within the canister 20 are drawn into the aspirator 40 via the recovery passage 50, the recovery solenoid valve 54 and the unidirectional check valve 52. In addition, due to the operation of the pressure control valve 82*p*, a predetermined pressure difference can be maintained between the primary chamber 73 and the secondary chamber 74. Accordingly, gas within the fuel tank T is introduced into the primary chamber 73 of the separation container 70 via the first passage 81 and the tank-side solenoid valve 81*v*.

The fuel component of the gas flown from the fuel tank T into the primary chamber 73 of the separation container 70 passes through the separation membrane 75 so as to be introduced into the secondary chamber 74, while the air component of the gas is remained within the primary chamber 73. The fuel component within the secondary chamber 74 is then introduced into the recovery passage 50 via the third passage 83. On the other hand, the air component within the primary chamber 73 is supplied into the canister 20 via the second passage 82 and the pressure control valve 82*p* in order to purge the adsorption material C within the canister 20. Therefore, it is possible to improve the desorption efficiency of the fuel vapor from the adsorption material C.

The fuel vapor, etc. (e.g., fuel vapor, air, etc.) existing within the canister 20 and the fuel component (those of fuel in vapor or liquid phase) existing within the secondary chamber 74 of the separation container 70 are drawn by the aspirator 40 via the recovery passage 50, the recovery solenoid valve 54 and the unidirectional check valve 52 and are then discharged from the aspirator 40 into the fuel F within the fuel tank T so as to be recovered.

(Method for Checking Leakage)

Methods for checking leakage from the fuel vapor processing apparatus of the above example will now be described. First, a method for checking leakage by introducing external air will be described.

Figure 4A:
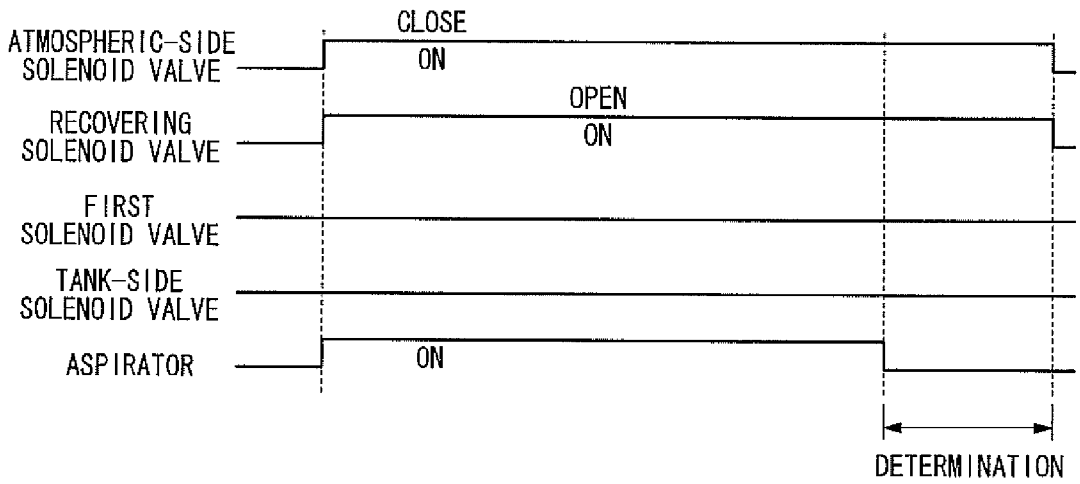
FIGS. 4(A) and 4(B) are time charts showing operations of various valves for checking leakage from the fuel vapor processing apparatus in different check modes.
Figure 4B:
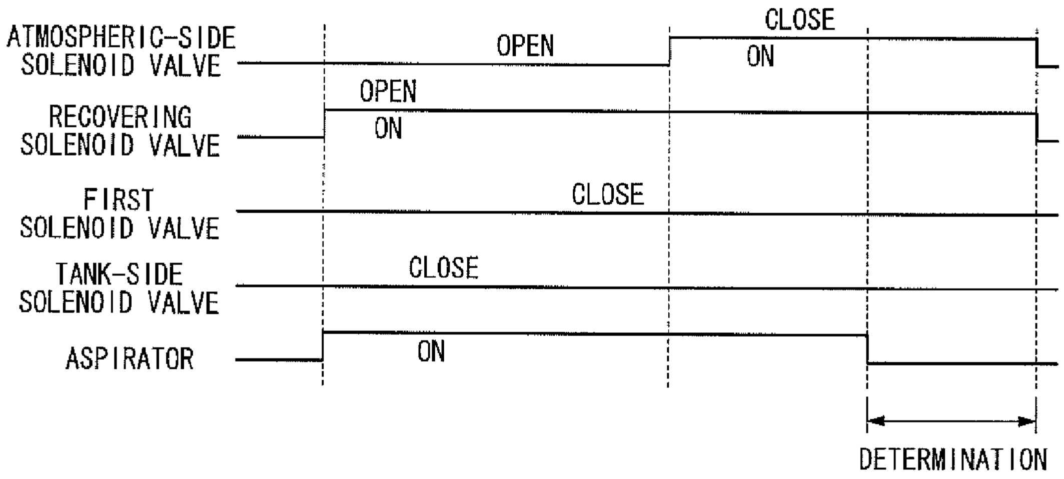
Figure 5:
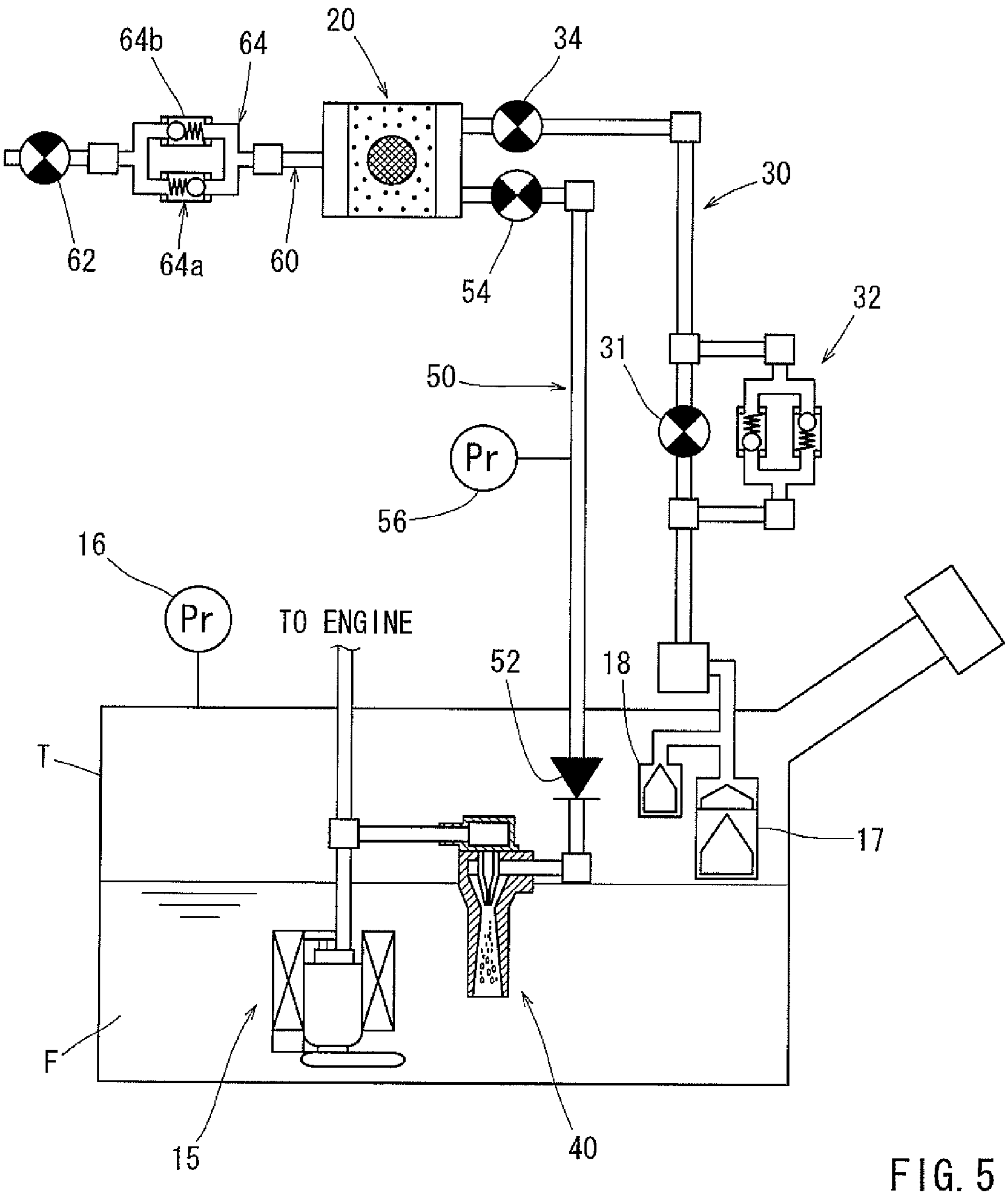
FIG. 5 is a schematic view of a fuel vapor processing apparatus incorporating an apparatus for checking leakage of fluid according to another example.
Figure 6:
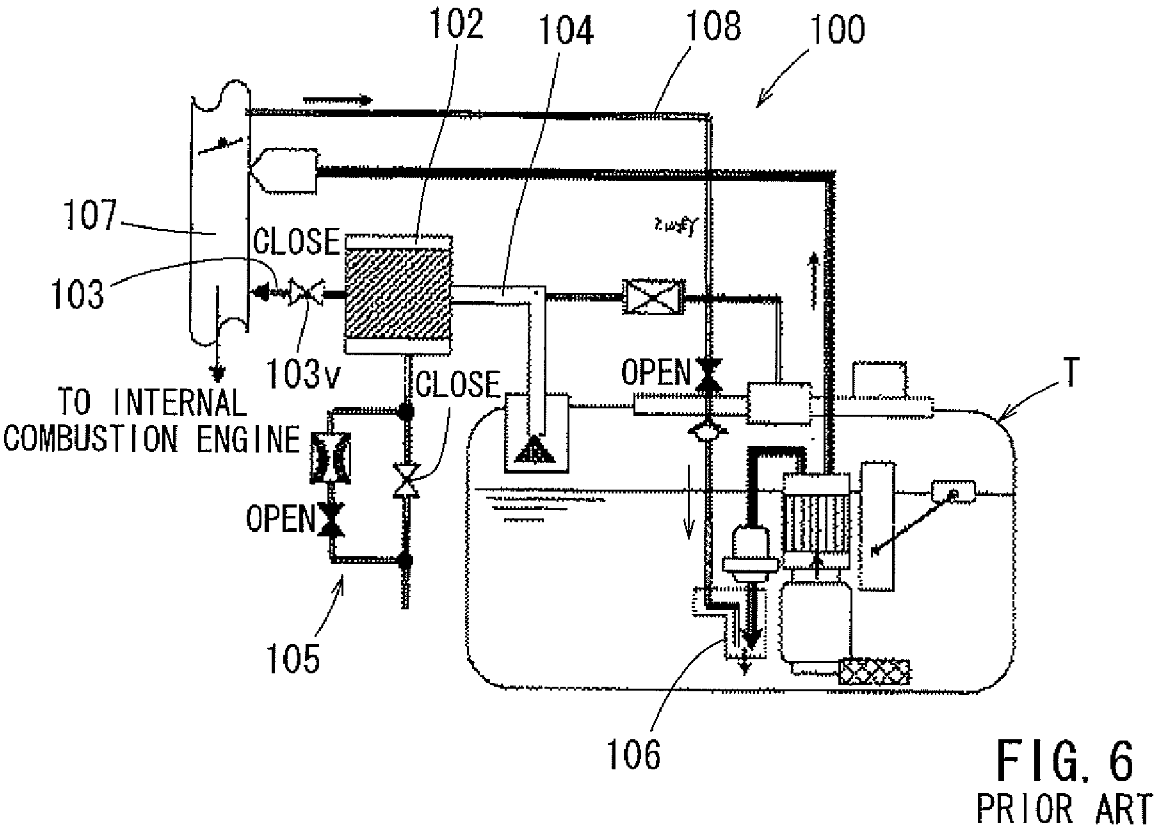
FIG. 6 PRIOR ART
FIG. 6 is a schematic view of a known fuel vapor processing apparatus incorporating an apparatus for checking leakage of fluid.

In this method, the fuel pump 15 is driven to operate the aspirator 40 on the condition that the atmospheric-side solenoid valve 62 of the atmospheric passage 60 is opened (turned OFF), the recovery solenoid valve 54 of the recovery passage 50 is opened (turned ON), the first solenoid valve 31 of the vapor passage 30 is closed (turned OFF), and the tank-side solenoid valve 81*v* of the first passage 81 is closed (turned OFF) as indicated in the time charge shown in FIG. 4(B). In this state, because the relationship "+5 kPa>P>−5 kPa" results for the internal pressure P of the fuel tank T, the bi-directional check valve 32 of the vapor passage 30 is closed.

As the aspirator 40 operates, external air is supplied into the fuel tank T via the atmospheric passage 60, the canister 20, the recovery passage 50 (and the unidirectional check valve 52 of the recovery passage 50). Therefore, the internal pressure of the fuel tank T gradually increases. When the internal pressure reaches a predetermined value, the atmospheric-side solenoid valve 62 of the atmospheric passage 60 is closed (turned ON).

Therefore, air contained within the canister 20 is drawn into the fuel tank T, so that the internal pressure of the fuel tank T further increase as the internal pressure within the canister 20 becomes negative. When the internal pressure of the canister 20 reaches a predetermined negative value, the fuel pump 15 and eventually the aspirator 40 are stopped.

The internal pressure of the canister 20 (i.e., a system pressure within Region I indicated in FIG. 3) and the internal pressure of the fuel tank T (i.e., a system pressure within Region II in FIG. 3) are monitored during a predetermined period. If a pressure increasing ratio of the internal pressure of the canister 20 is smaller than a reference pressure increasing ratio and a pressure decreasing ratio of the internal pressure of the fuel tank T is smaller than a reference pressure decreasing ratio, determination is made that there is no occurrence of leakage (i.e., no hole in the system causing leakage).

Next, a method for checking leakage without introducing external air will be described.

In this method, the fuel pump 15 is driven to operate the aspirator 40 on the condition that the atmospheric-side solenoid valve 62 of the atmospheric passage 60 is closed (turned ON), the recovery solenoid valve 54 of the recovery passage 50 is opened (turned ON), the first solenoid valve 31 of the vapor passage 30 is closed (turned OFF), and the tank-side solenoid valve 81*v* of the first passage 81 is closed (turned OFF) as indicated in the time charge shown in FIG. 4(A).

Therefore, air contained within the canister 20 is drawn into the fuel tank T, so that the internal pressure within the canister 20 becomes negative and the internal pressure of the fuel tank T increases. When the internal pressure of the canister 20 reaches a predetermined negative value and the internal pressure of the fuel tank T reaches a predetermined positive value, the fuel pump 15 and eventually the aspirator 40 are stopped.

Next, the internal pressure of the canister 20 (i.e., a system pressure within Region I indicated in FIG. 3 and the internal pressure of the fuel tank T (i.e., a system pressure within Region II in FIG. 3) are monitored during a predetermined period in the same manner as the above-described method, so that it is determined whether or not leakage occurs.

According to the above methods, it is possible to check leakage from the fuel vapor processing apparatus in the state that the pressure on the canister side (Region I in FIG. 3) is kept negative, while the pressure on the fuel tank side (Region II in FIG. 3) is kept positive. Therefore, in comparison with a method of checking leakage in the state that both of pressures on the canister side and the fuel tank side are kept positive, it is possible to reduce the amount of external air flowing into the fuel vapor processing apparatus. Hence, it is possible to reduce the amount of air that may be discharged from the fuel vapor processing apparatus after checking leakage. As a result, it is possible to prevent or inhibit fuel vapor from being discharged from the canister 20 to the atmosphere.

Possible Modifications

The above examples may be modified in various ways. For example, in the above examples, the fuel pump 15 and the aspirator 40 are operated for checking leakage. However, it may be possible to provide a bi-directional check valve 64 between the canister 20 and the atmospheric-side solenoid valve 62 in the atmospheric passage 60 in order to keep a negative pressure within the canister 20 and to keep a positive pressure within the fuel tank T. The bi-directional check valve 64 may include a positive check valve 64*a* and a negative check valve 64*b*. The negative check valve 64*b* may close, for example, when the pressure is equal to or more than −5 kPa. The positive check valve 64*a* may close, for example, when the pressure is equal to or less than 0.03 kPa. With this arrangement, it is possible to maintain a positive pressure within the fuel tank T. For example, when the internal pressure of the canister 20 has become negative due to drop of fuel level by the consumption of the fuel F, the negative pressure within the canister 20 can be maintained by the operation of the bi-directional check valve 64. On the other hand, when the pressure of the fuel tank T has increased due to increase of temperature, the positive pressure within the fuel tank T can be maintained by the action of the unidirectional check valve 52. Therefore, leakage from the system can be determined by monitoring the pressure within the fuel tank T by the first pressure sensor 16 and by monitoring the pressure within the canister 20 by the second pressure sensor 56. Hence, it is not necessary for driving the fuel pump 15 for the purpose of only checking leakage from the system. Therefore, it is possible to save the energy consumption.

This invention claims:

1. An apparatus for checking leakage of fluid from a fuel vapor processing apparatus including a canister capable of communicating with a fuel tank of an automobile via a communication passage, comprising:

a passage interrupting device provided in the communication passage;

a first pressure detecting device capable of detecting a first pressure, the first pressure being a pressure within the canister or a pressure equivalent to the pressure within the canister; and a second pressure detecting device capable of detecting a second pressure, the second pressure being a pressure within the fuel tank or a pressure equivalent to the pressure within the fuel tank;

wherein in the state that the first pressure is negative and the second pressure is positive, the passage interrupting device can interrupt communication between a side of the canister and a side of the fuel tank for checking leakage of fluid from the fuel vapor processing apparatus.

2. The apparatus for checking leakage of fluid as in claim 1, wherein the passage interrupting device comprises a unidirectional check valve permitting flow of fluid from the canister toward the fuel tank and preventing flow of fluid from the fuel tank toward the canister.

3. The apparatus for checking leakage of fluid as in claim 1, further comprising a negative pressure generating device disposed within the fuel tank and capable of drawing air within the canister into the fuel tank, so that the first pressure becomes negative and the second pressure becomes positive.

4. The apparatus for checking leakage of fluid as in claim 3, wherein the passage interrupting device comprises a unidirectional check valve permitting flow of fluid from the canister toward the fuel tank and preventing flow of fluid from the fuel tank toward the canister.

5. The apparatus for checking leakage of fluid as in claim 3, wherein the negative pressure generating device generates a negative pressure by utilizing a flow of fuel discharged from a fuel pump disposed within the fuel tank.

6. The apparatus for checking leakage of fluid as in claim 5, wherein the passage interrupting device comprises a unidirectional check valve permitting flow of fluid from the canister toward the fuel tank and preventing flow of fluid from the fuel tank toward the canister.

7. A method for checking leakage of fluid from a fuel vapor processing apparatus including a canister capable of communicating with a fuel tank of an automobile via a communication passage, comprising the steps of:

setting a pressure within the canister to be negative;

setting a pressure within the fuel tank to be positive;

interrupting communication between a side of the canister and a side of the fuel tank of the communication passage in a state that the pressure within the canister is negative and the pressure within the fuel tank is positive; and monitoring the pressure within the canister or its equivalent and monitoring the pressure within the fuel tank or its equivalent.

8. The method as in claim 7, the steps of setting the pressures within the canister and the fuel tank comprise:

providing a negative pressure generating device within the fuel tank; and operating the negative pressure generating device for drawing air within the canister into the fuel tank via the communication passage, so that the pressure within the canister becomes negative and the pressure within the fuel tank becomes positive.

9. An apparatus for checking leakage of fluid from a fuel vapor processing apparatus including a canister capable of communicating with a fuel tank of an automobile via a communication passage, comprising:

an interrupting device capable of interrupting communication between the canister and the fuel tank when a pressure within the canister is negative and a pressure within the fuel tank is positive;

a first pressure detecting device capable of detecting a first pressure, the first pressure being the pressure within the canister or a pressure equivalent to the pressure within the canister, and a second pressure detecting device capable of detecting a second pressure, the second pressure being the pressure within the fuel tank or a pressure equivalent to the pressure within the fuel tank, wherein leakage from the fuel vapor processing apparatus is determined by comparing the first pressure and the second pressure with a first reference pressure and a second reference pressure, respectively.

10. A method for checking leakage of fluid from a fuel vapor processing apparatus including a canister capable of communicating with a fuel tank of an automobile via a communication passage, comprising:

interrupting communication between the canister and the fuel tank when a pressure within the canister is negative and a pressure within the fuel tank is positive;

detecting a first pressure and a second pressure, the first pressure being the pressure within the canister or a pressure equivalent to the pressure within canister, the second pressure being the pressure within the fuel tank or a pressure equivalent to the pressure within the fuel tank; and determining leakage from the fuel vapor processing apparatus by comparing the first pressure and the second pressure with a first reference pressure and a second reference pressure, respectively.

* * * * *